April 18, 1933.  R. E. PERKINS  1,904,749
CORN HARVESTER
Filed July 2, 1931  6 Sheets-Sheet 5
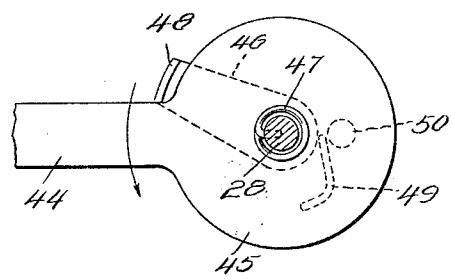
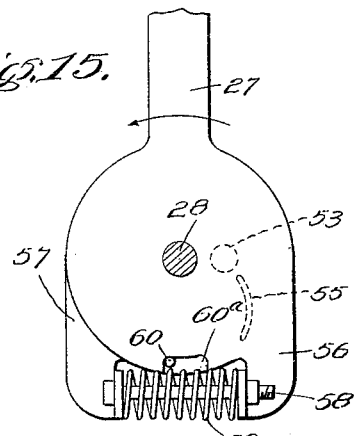
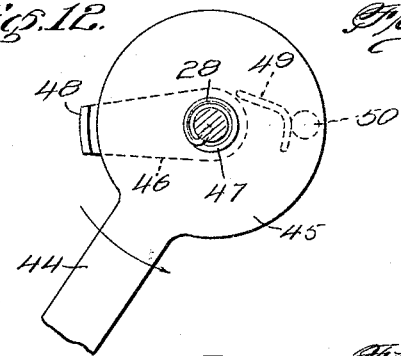
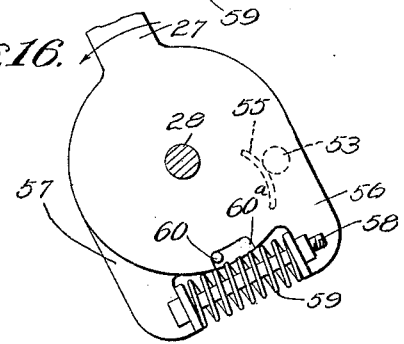
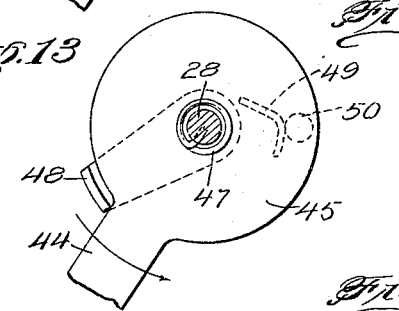
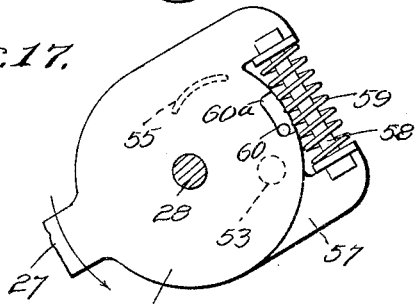
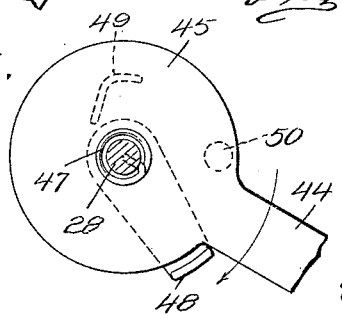
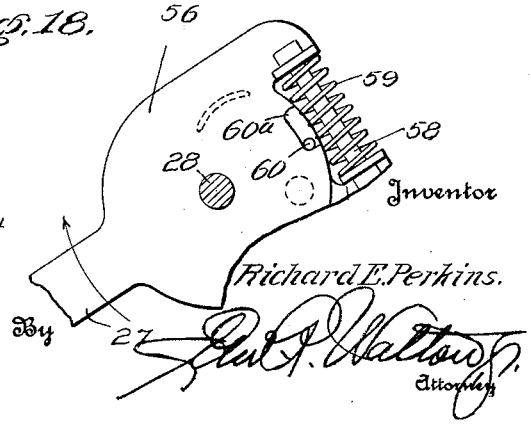
Inventor
Richard E. Perkins.
By
Attorney April 18, 1933.  R. E. PERKINS  1,904,749
CORN HARVESTER
Filed July 2, 1931   6 Sheets-Sheet 6
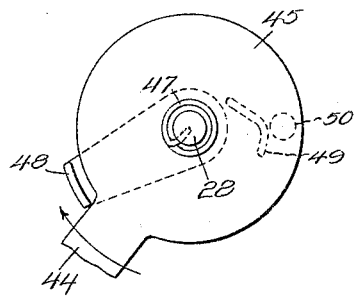
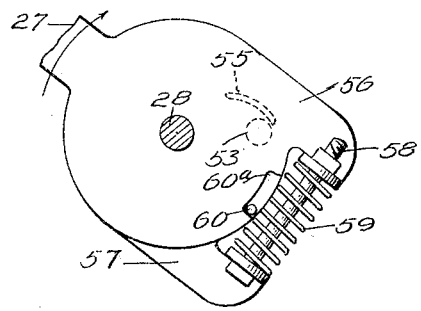
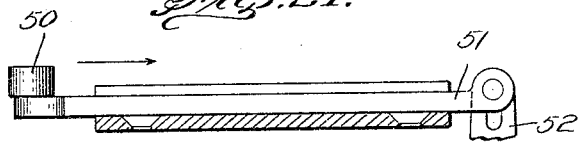
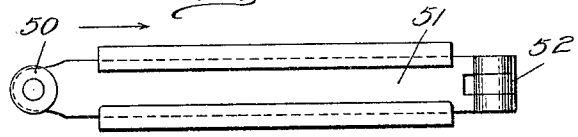
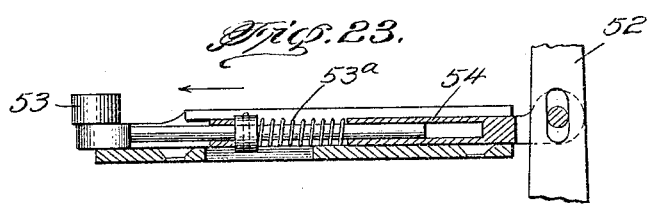
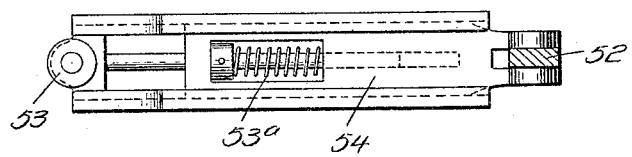
Inventor
Richard E. Perkins.
By
Attorney Patented Apr. 18, 1933

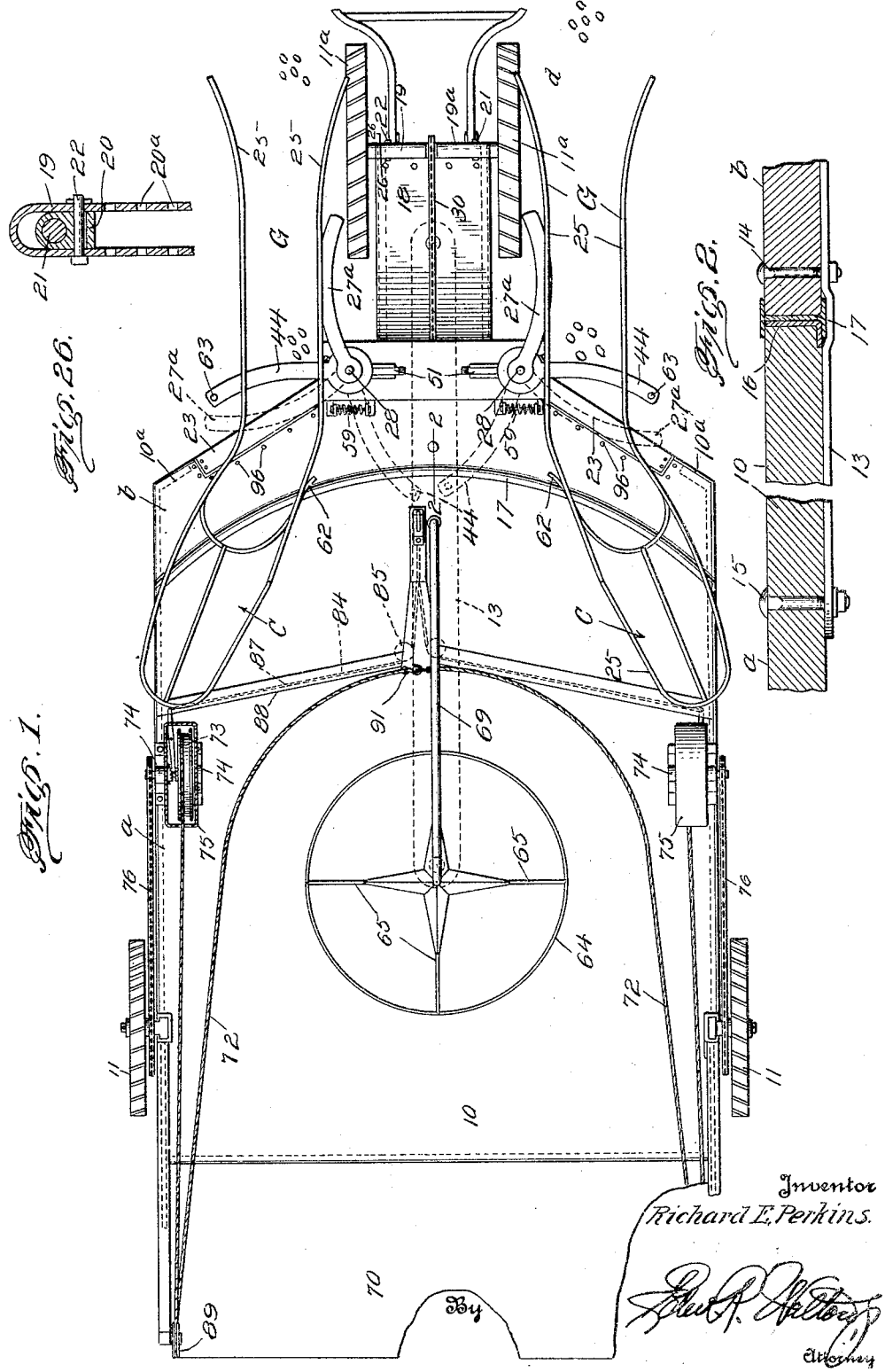

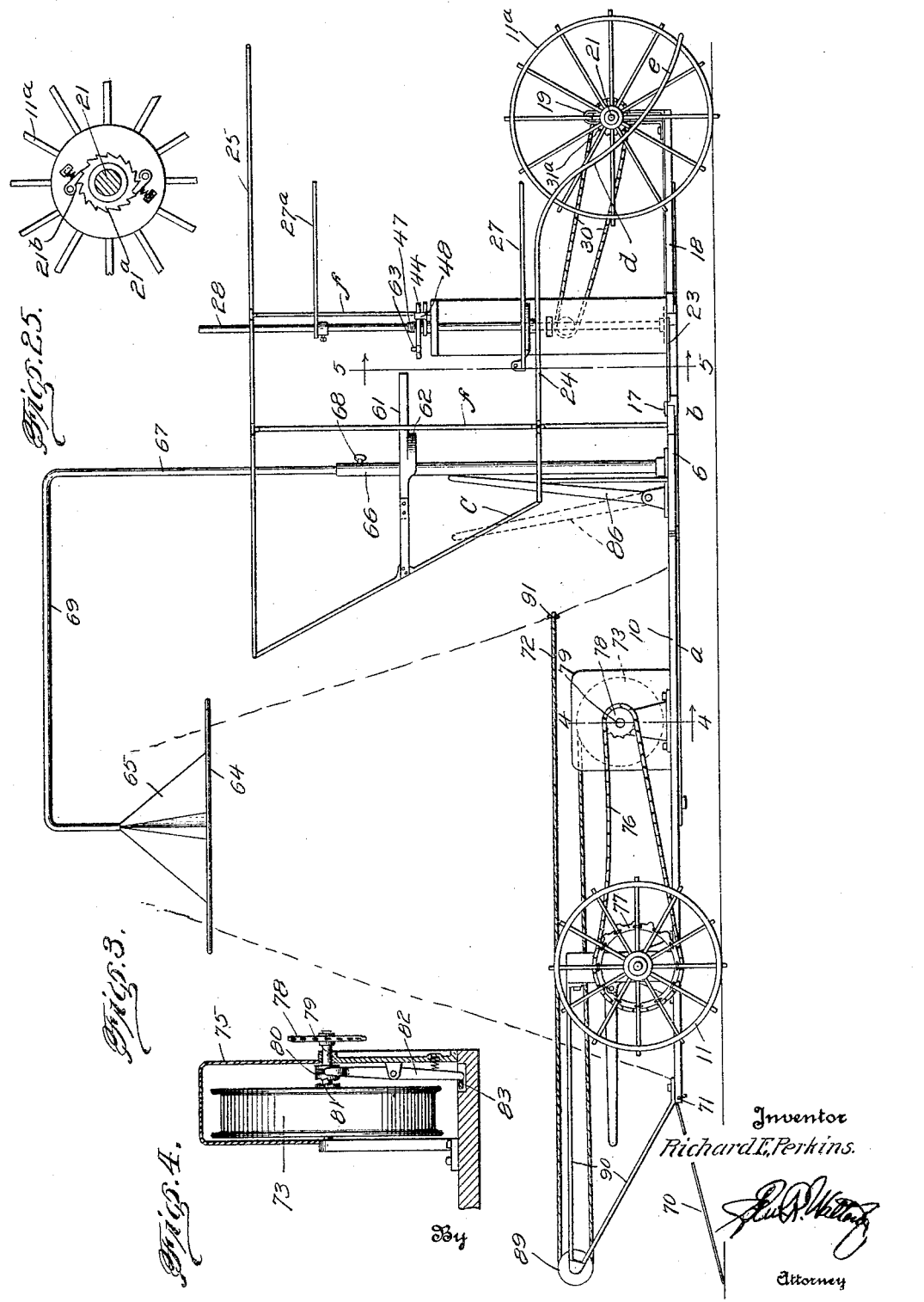

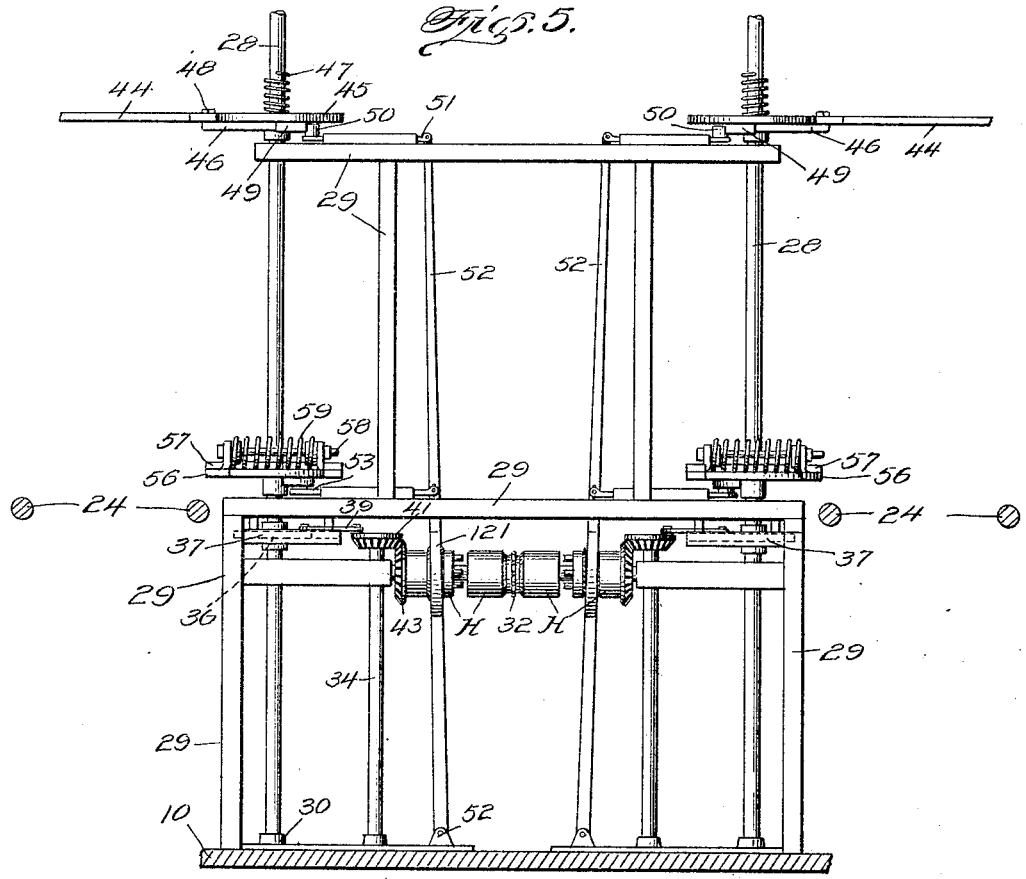
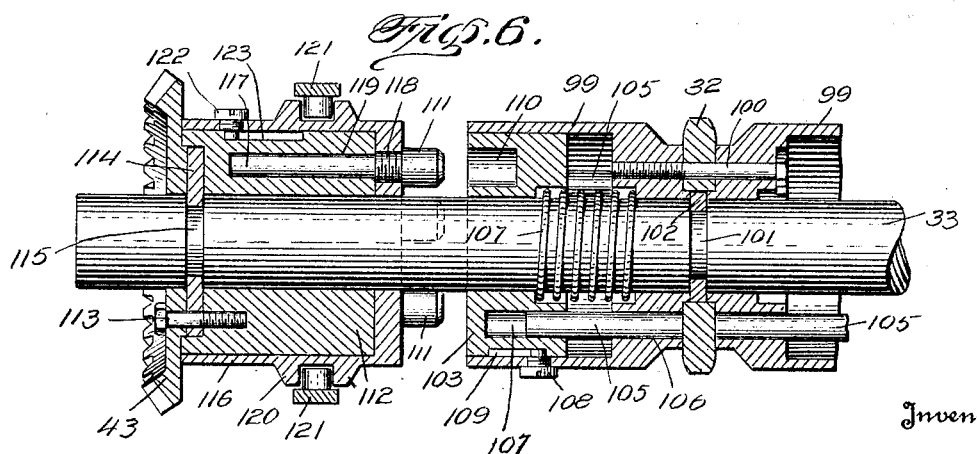

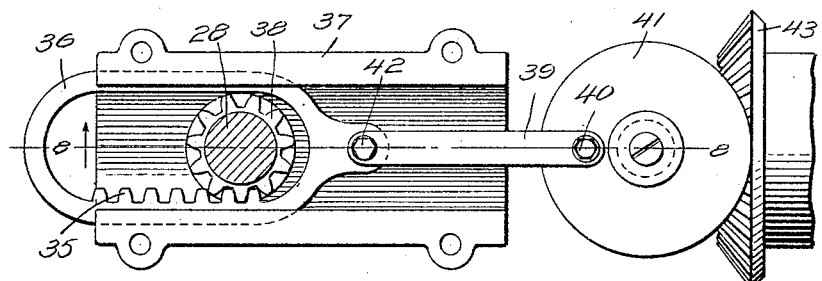
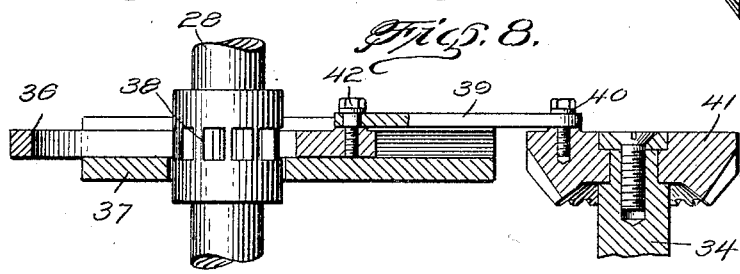
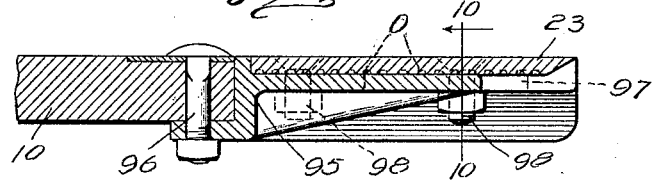
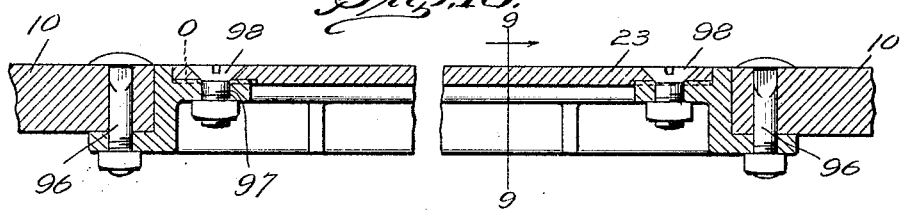

1,904,749

UNITED STATES PATENT OFFICE

RICHARD E. PERKINS, OF EVERETT, MASSACHUSETTS

CORN HARVESTER

Application filed July 2, 1931. Serial No. 548,401.

The present invention is a corn harvesting machine.

An object of the present invention is the provision of a suitable vehicle or platform movable over a field of corn, preferably to straddle two rows of corn, carrying means for gathering and cutting the corn stalks at a point near the ground, the gathering means including a cradle in which the cut stalks will rest and from which they may be removed by the attendant and shocked on said platform as the harvester proceeds, and means actuated by the movement of the harvester for discharging the shocked corn stalks from the platform to the ground.

Another object of the invention is the provision of a corn harvester of the above stated character wherein the gathering means includes a sweep arm adapted to press and move a number of corn stalks against and over the knife, said sweep arm being placed in operation only when a quantity of stalks have been gathered and are about to be presented to the knife, said sweep arm also acting as a brace to prevent the stalks from falling forwardly of the knife of the harvester as the latter advances.

Another object of the invention is the provision of a corn harvester having an advancing knife and an oscillating sweep arm to press a number of gathered stalks against and over the knife and of a tripping means engageable by a quantity of the gathered stalks for setting said sweep arm in operation.

With the above and other objects in view, the invention resides in the sundry details of construction, combination and arrangement of parts hereinafter more fully described and pointed out in the appended claims.

In the drawings, which show by way of example one embodiment of the invention,

Figure 1 is a plan view of the harvester;

Figure 2 is a fragmentary sectional view substantially on line 2—2 of Figure 1;

Figure 3 is a side elevation of the harvester as shown in Figure 1;

Figure 4 is a vertical sectional view taken substantially on line 4—4 of Figure 3;

Figure 5 is a vertical sectional view taken substantially on line 5—5 of Figure 3;

Figure 6 is a fragmentary sectional view through the clutch mechanism shown in Figure 5;

Figure 7 is a view of the drive connection between the source of power and the moving parts of the gathering means and which transpose rotary movements in oscillating movements;

Figure 8 is a vertical sectional view taken substantially on line 8—8 of Figure 7;

Figure 9 is a sectional view of the stalk cutting blade and taken substantially on line 9—9 of Figure 10;

Figure 10 is a vertical sectional view taken substantially on line 10—10 of Figure 9;

Figures 11 to 14 inclusive show the successive movements of the trip arm 44 during one-half of its cycle of movement, Figure 11 showing its normal position and Figure 14 showing its extreme reverse position;

Figures 15 to 18 inclusive are similar views showing the construction and operation of the sweep brace arm 27 and the corresponding position of its movements with respect to those of the trip arm;

Figure 19 is a plan view similar to Figure 14 but showing the trip arm partly completing its return or reverse movement and the position of the cam 49 with respect to the throw arm 50;

Figure 20 is a plan view of the arm 27 and showing its relative position of its associated parts when the trip arm 44 is in the position shown in Figure 19;

Figure 21 is a side elevation of the throw arm actuated by said trip arm;

Figure 22 is a plan view of the device shown in Figure 21;

Figure 23 is a longitudinal sectional view of the clutch throw arm actuated by the return movement of the sweep arm 27;

Figure 24 is a plan view of the mechanism shown in Figure 23;

Figure 25 is a sectional view through the hub portion of the front traction wheel 11*a* showing its connection with the axle 21; and Figure 26 is a view taken substantially on line 26—26 of Figure 1 and through the front axle hanger.

Referring in detail to the drawings, in which like characters denote similar and like parts throughout the several views, the machine of the present invention comprises a movable body or platform 10 which is mounted on rear traction wheels 11 and forward traction wheels 11*a*. This platform is mounted on a suitable framework and may be of metal, wood or any other material, and preferably is of width sufficient to straddle two rows of corn with the rear traction wheels passing on the outside of said rows and the forward traction wheels passing between said rows, suitable draft means being connected to the front of the vehicle by which it may be drawn. The major portion of the platform is preferably rectangular in plan and of a length which will provide in its rear portion an area which will accommodate a shock of corn stalks and may be made of such length as may accommodate one or more shocks arranged in alignment longitudinally of the harvester. The forward end of the rear section *a* has an arcuate edge against which a complemental rear edge of the forward section *b* of the platform engages. The sections *a* and *b* are connected together by a link 13, preferably on their undersurfaces, which link extends along the longitudinal center of the platform sections and is secured thereto by king bolts 14 and 15. The arcuate edges of the sections *a* and *b* of the platform are preferably covered with wear plates 16 and 17, the plate 17 having upper and lower lateral flanges which overlap the adjacent sections. It will thus be seen that the machine of considerable length may be turned in a small area.

The forward end of the section *b* of the platform 10 is provided with a reduced extension 18 positioned at the longitudinal center thereof, and this extension carries at its forward end a pair of vertical loop hangers 19 and 19*a* in which slide-blocks 20 are mounted and through which latter the front axle 21 rotatably extends. These hanger devices may be formed by bending the forward end of the extension 18 into upstanding loops, or the loops may be provided in any other approved manner. However, the vertical legs of the loops are provided with a series of vertically disposed openings through which bolts 20 extend for the purpose of adjusting the front end of the platform with respect to the ground. It will therefore be seen that when the platform is in its lowermost position the axle 21 will engage the bight of the loops and when in other adjusted positions the bolts 22 will support the axle, thus suspending the front end of the platform in the desired position.

On each end of the axle 21 is a ratchet wheel 21$^a$ engageable by a spring pressed pawl 22$^b$ on the hub of adjacent wheel 11$^a$. This construction prevents the axle from being rotated by forward movement of the wheel 11$^a$ and also compensates for the differential movement of the wheels 11$^a$ when turning.

By reason of the reduced extension 18, the forward end of the platform is provided with obliquely disposed edges 10$^a$ on opposite sides thereof, said edges diverging rearwardly from the extension 18. On these edges 10$^a$ are stationary cutting blades 23 suitably mounted for removal and replacement and to engage the corn stalks of adjacent rows, respectively, at or near the base of the stalks as the harvesting device proceeds forwardly over the field.

In Figures 9 and 10 is shown the manner in which the cutting blades 23 may be mounted. The inclined diverging edges 10$^a$ of the platform 10 are recessed for a distance so as to receive a knife bracket 95 which comprises a right angular member *m* embracing the edge of the cutaway portion and an outwardly extending ledge *n* having its upper edge provided with a series of corrugations or other projections *o* which engage with the complementary-formed underface of the knife blade 23. The bracket 95 is secured in position by bolts 96 and the blade 23 is provided with slots 97 through which bolts 98 extend. The slots 97 in the blade permit outward adjustment of the blade to compensate for wear.

Associated with each cutter 23 is a stalk gathering unit G, and since each unit is identical, except being positioned on opposite sides of the platform, for the purpose of clarity only the construction of one unit will be described in detail.

For the purpose of gathering or guiding the stalks of the rows to the knife 23, the gathering device is provided with lower and upper pairs of spaced guide rods 24 and 25, respectively, which project forwardly. The forward end portions of the lower guide rods extend downwardly toward the base of the stalks, as shown at *d* in Figure 3, but both guides 24 and 25 have their extremities horizontally and outwardly flared, as at *e* in Figure 1. These guide rods 25 are for the purpose of gathering in the heads of the stalks and preventing them from falling sidewise of the harvester. The rods 24 and 25 are supported in position by uprights *f* and extend rearwardly past their respective knives 23 where they then extend obliquely toward the side edges of the platform 10, the rods 24 however extending rearwardly for a greater distance than the rods 24. The rear ends of these rods are joined together as at 24ª and 25ª to provide an inclined crib C, the loop ends of these rods being connected by a brace rod 26. These cribs C are, as shown particularly in Figure 2, diverged rearwardly and provide therebetween a space in which the attendant, riding on the platform, may conveniently move about and gather the corn stalks from the cribs.

In order to prevent the cornstalks from being pushed down or sliding off the knife and falling to the ground without being properly severed as the harvester advances, rearwardly moving sweep arms 27 and 27a are provided to cooperate with the knife of each respective unit, when corn stalks have been presented by the gathering rods to the knives. This mechanism, associated with each knife 23, comprises a pair of horizontal arms 27 and 27a mounted on a vertical shaft 28 and normally assumes the inoperative position outside of the gathering guides as shown in Figure 1. The shaft 28 extends downwardly through a vertical framework, generally indicated 29, and in which it is journaled and has its lower end resting in a cup bearing 30 mounted on the platform 10. The framework 29 may be constructed of any suitable material and is positioned on the forward section b of the platform 10 directly to the rear of the forward extension 18. The vertical shafts 28 are operated from the front axle 21 through a sprocket chain 31 which passes around the sprocket 31ª fast on the axle and over a sprocket wheel 32 rotatably mounted about the stationary shaft 33 supported at its end between the uprights 34 mounted on the platform of the device.

The rotative motion of the sprocket 32 is transmitted through a suitable drive mechanism to impart oscillating movement to the shafts 28. This mechanism, as here shown, may include a reciprocating rack 35 carried by a slide 36 mounted in a guide 37 mounted on the frame 29. The slide 36 is preferably in the form of a loop through which the shaft 28 extends and the rack 35 meshes with a gear 38 fast on the shaft 28. A link 39 having an eccentric connection, as at 40, with a gear 41 is connected at 42 to the slide 36. The gear 41 is journaled on the top of the upright 34 and meshes with a gear 43 having connection with a clutch H. Thus it will be seen that the continuous rotary movement transmitted to the gear 43 from the sprocket 32 will be transmitted to the rack in the form of a reciprocating motion and from the rack 35 as an oscillating motion to the shafts 28.

The sweep arms 27 and 27a are normally inoperative and are only brought into play just prior to the time that the corn stalks are presented to the knives so that there will always be proper support and resistance for the stalks against the advancing movement of the knives and so that the stalks will not be prematurely beaten down or presented to the knives without proper resistance and support thereagainst as is often the case with continuously operating beaters or sweeps. In order to effect this result, a horizontal trip arm 44 is mounted on the shaft 28 and is positioned between the lower and upper gathering guides 24 and 25 and normally extends across the path between said guides and in advance of the knife 23.

This trip arm 44 is carried by a disk 45 at its inner end which is loosely mounted on the shaft 28. Below and adjacent the disk 45 is a disk, or similar element, 46 mounted fast on the shaft 28. A torsional helical spring 47 is positioned around the shaft 28 and has one end secured to the shaft, preferably by extending into an opening therein, as at $x$, and the other end of the spring 47 extends into an opening in the disk as at $y$, see Figure 5. This helical spring serves the purpose of holding the disks 45 and 46 together and also of turning the disk 45 in one direction, that is, moving it in a direction forwardly of the knife edge 23. This forward movement of the disk 45 is arrested by a lug 48 carried on the disk 46 and extending into the path of movement of the arm 44.

Thus, with parts in normal position, as shown in Figures 1, 11 and 16, when the corn stalks engage the trip arm 44, the latter will be moved inwardly toward the knife 23 against the tension of the spring 47 to the position shown in Figure 12. During this movement of the trip arm 44, a cam 48 on the under-surface of the disk 45 engages a roller 50 mounted on a sliding bar 51 (Figures 1 and 5). The sliding bar 51 is pivotally connected with a clutch throw lever 52 pivoted at 53 to the platform of the harvester. This movement of the lever 52 will engage the clutch members H by the reciprocating motion of the rack 35, thereby causing the shaft 28 to oscillate. The first movement of the oscillation of the shaft 28 brings the lug 48 up against the arm 44, as shown in Figure 13, to swing the arm 44 to dotted line position in Figure 1 and in full line position in Figure 14; and at the same time, the shaft 28 swings the sweep arms 27 and 27a from their position shown in Figures 1 and 16 toward the knife edge 23 and behind the hill of corn which has tripped the arm 44. By reason of the fact that the corn stalks are held in the ground at their bases and due to the fact that the arms 27 and 27a brace the upper portion of the stalks against the pressure of the knife blades being drawn thereagainst, the stalks will be held in their upright position during the cutting operation and will be pressed backward into an inclined position in the cradle C after being severed.

As the sweep arm 27 moves toward the knife 23, a yieldably mounted roller or lug 53 yieldably mounted on the sliding arm 54 will ride on the outer face of an arcuate cam rib 55 eccentrically disposed on the inner end of the arm 27 and is compressed against the spring 53a, as shown in Figure 17. In Figure 18, the position of the arm 27 and the cam 55 and spring pressed lug 53 are shown at or about the time the corn stalks of a hill are being cut by the knife 23. Figure 19 shows the position of the parts, when the arm 27 is in the dotted line position shown in Figure 1, at which time the lug 53 rides off the cam 55 and is projected outwardly by the spring 53a (Figures 23 and 24) in a position to engage the inner face of the cam 55 on its return movement, as shown in Figure 20.

By this time the rack 35 has started its sliding movement in the opposite direction, thereby moving the sweep arms 27 and 27a toward their normal full line position in Figure 1. This same movement of the shaft 28 also carries with it the disk 46, as indicated in Figure 15, and since the spring 47 is constantly urging the arm 44 against the lug 48, the arm 44 will also assume its normal full line position in Figure 1.

Just before the end of this return movement of the arms 27 and 27a, the roller 53 on a sliding arm 54 will ride upon the inner surface of the cam 55 which will pull the slide 54 in the direction of the arrows in Figures 23 and 24, thus moving the clutch throw lever 52 to disengage the clutch members H, causing the parts 44, 27 and 27a to rest until the stalks of the next hill of corn has engaged the trip lever 44, when the operation is repeated.

The sweep arm 27a, as above stated, is fast on the shaft 28 while the sweep arm 27 is yieldably mounted so as to yield under pressure of the stalks between it and the knife blade 23. This yielding action is quite important and desirable because it assures the proper cutting of the stalks and, after being severed, imparts a quick inward kick to the arm 27 so as to push them rearwardly beyond the blade and to throw them in an inclined position on the cradle C. This function may be accomplished by providing two disks or other suitable members 56 and 57 concentric about the shaft 28, the disk 56 being fast on the shaft and the disk 57 carrying the arm 27 and being loose upon the shaft. Said disks may be in juxta-position and each have a lug $p$ thereon, respectively, through which a bolt 58 loosely extends and between which a helical spring 59 is disposed and prevents the yielding movement of the arm 27, which may be limited by a stop 60 on the disk 56 which engages the shoulder $60^a$ on the disk 57.

In order that the return movement of the trip arm 44 will not throw from the crib the corn stalks already deposited therein, a resilient guard arm 61 is provided between the lower and upper gathering guides 24 and 25 and lies directly underneath the innermost guide of each pair of guides 24 and 25. This guard arm carries an outwardly flared finger or projection 62 which is engaged by a lug 63 on the trip arm 44, upon both its backward and its forward return movements. On its backward movement the lug 63 engages the finger 62 and will ride from the front surface thereof, but on its forward or return movement the lug 63 will engage the rear face of the finger 62 and will cause the guard arm 63 to flex and lie across the front end of the crib C to hold the corn stalks therein and prevent the return movement of the trip arm from throwing the same forward and out of the crib. As soon as the lug 63 has passed out of engagement with the finger 62, the guard 61 will return to its normal position. It will of course be understood that the dimensions of the parts 61 and 62 are such as will accomplish the above result.

As the corn stalks fall to the cribs C, the attendant, who is stationed on the platform between the same, will gather them up in his arms and remove them from the cribs through the openings or spaces between the rods 24 and 25, and will arrange the same into a shock on the rear portion $b$ of the platform 10. In order to facilitate the formation of the shock, a device S is provided for forming the crown of the shock. This device consists of a ring or annulus 64 having radiating arms 65 extending from its center and from which point the device is supported in position by any suitable means. For the purpose of the present illustration, this support is shown as comprising a standard 66 mounted on the forward portion of the rear section $a$ of the platform 10 having a vertically adjustable rod 67 telescoping therein and held in vertically adjusted positions by any means, such as a wing bolt 68. The upper end of the rod 67 is provided with a horizontal extension 69 projecting rearwardly over the portion of the platform on which the shock is to be formed and has its extremity secured to the center of the crown-forming device S, as clearly illustrated in Figures 1 and 3. This shocking device forms the crown of the shock and this is accomplished by extending the heads of the stalk upwardly between the radiating arms 65 thereof with the butt ends of the stalk spreading outwardly as indicated in dotted lines in Figure 3. Thus it will be understood that the shock may be formed during the cutting and gathering operation of the harvester.

After the shock has been formed, it is to be moved from the platform onto the ground in the rear of the harvester. To this end the rear end of the harvester has a downwardly inclined apron 70 secured at 71 thereto and having its other end either dragging on the ground or suspended a slight distance above.

In order to move the shock from the platform, the shock crown-forming device S is raised upwardly out of disengagement therewith and a rope sling 72 is placed around the shock, in a manner shown in Figures 1 and 3. The sling comprises a length of rope or cable, or other flexible material, having its end portions wound, respectively, about drums 73 conveniently positioned on the platform on opposite sides thereof, the drum being rotatably mounted on a shaft 79 carried in bearings 74 and preferably enclosed by a housing 75. Each drum is actuated by sprocket chains 76 passing over a sprocket wheel 77 carried on the adjacent traction wheel 11 and a sprocket wheel 78 mounted on the shaft 79 of the drum. The shaft 79 carries a slidable clutch member 81 carried on the drum. The clutch members are normally held out of engagement by a spring pressed lever 82 and are placed into engagement by a lever 83 pivotally mounted on the platform and connected through flexible cables 84 which pass over pulleys 85 and which are secured to the lower end of the manually operated lever 86. The cables lie in a groove 87 made in the platform and covered by a sheet of covering strip 88.

The cable forming the unloading sling 72 extends from each drum 73 rearwardly and passes over deep-grooved pulleys 89 disposed over each rear corner portion of the apron 70 and supported in position by suitable bracket arms 90 connected with the platform 10.

A loop of the sling is extended around the shock at a point below its center portion so that the bight of the sling loop will engage about the forward portion of the stalk while on the platform. By throwing the lever 86 to dotted line position the lever 83 will be actuated to operate the spring pressed lever 82 and move the clutch member 80 into engagement with the clutch member 81 on the drums. Thus, as the harvester proceeds down the field, its motion will drive the drums and wind the cable of the sling thereabout causing the shock to move rearwardly over the platform and down the apron 70 onto the ground. After the shock has been discharged to the ground, the attendant will move the lever 86 to full line position thus disengaging the clutch members 80 and 81.

For the purpose of facilitating the disposition of the sling about the shock, fastening member 91 (which may be in the form of a hook and eye) may be interposed in the length thereof at the portion ordinarily forming the bight of the sling loop.

It will also be understood that the platform may be vertically adjusted on the rear wheels 11 by any suitable means, well known in the art, through a lever or operable member 11$^b$.

The clutches H shown in Figure 5 may be of any suitable construction. However, the embodiment of one form of clutch, shown in Figure 6, may be used in the present machine, and since the clutch mechanisms are duplicated on opposite sides of the sprocket 32, Figure 6 only illustrates one clutch unit. As above stated, the sprocket 32 rotates on the supporting shaft 33 and each clutch unit comprises a shell 99 on one side of the sprocket 32 which is secured together by a plurality of bolts 100 suitably positioned around the shaft 33. The shaft 33 is preferably grooved, as at 101, at a point opposite the sprocket 32 and in which groove a split washer 102 is interposed and projects beyond the groove and against the inner circumference of the sprocket wheel 32 to form a key to prevent axial movement of the sprocket and the shells 99 on the shaft 33. Each shell 99 is opened at its outer end and has therein an annulus or collar 103 having a sliding fit with the inner walls of the shell and rotatable on the shaft 33. The inner face of the collar 103 is provided with a plurality of equispaced borings or recesses 104 in each of which one end of a plurality of pins 105 extends, the other end of the pins being swedged into openings 106 in the base of the shell. The pins 105 prevent rotation of the collar 103 independently of the shell 99. Interposed between the base of the shell and the inner face of the collar 103 is a compression spring 107 which normally urges the collar outwardly toward the open end of the shell, the inner and outward movements of the collar being limited by a stock pin 108, and extending into a lock-key 109. The outer face of the collar is provided with a series of equi-spaced openings 110 adapted to receive complemental projections 111 on the male member of the clutch unit.

The male member of the clutch comprises an annulus or collar 112 surrounding the shaft and rotatable thereon and bolted to one face of the gear 43 by means of a bolt 113. In order to prevent sliding movement of the gear 43 and said collar on the shaft, a split washer 114 is interposed between the same and projects into annular grooves 115 formed in the shaft 33. Surrounding the collar 112 and having an axial sliding fit therewith is an outer shell 116. The front face of this shell is closed, whereas the front face of the shell 99 is open. On the front face of the shell 116 and arranged in equi-spaced positions around the shaft 33 are projecting studs 111 receivable into the openings 110 of the female element of the clutch. These studs have reduced elongated rear projections 117 which are threaded into the front face of the shell 116, as at 118, but which slidably engage in borings 119 provided in the collar 112. Thus it will be seen that the shell 116 will have an axial sliding movement on the collar 112 but is prevented from rotation thereon by the projecting pins 117. The circumferential faces of the shell 116 are provided with opposed shoulders 120 between which is engaged a yoke 121 on the clutch throw levers 52. Consequently, when the trip arm 44 moves the clutch lever 52, the shell 116 of the male clutch element moves toward the female element 103 to engage in the openings 110. Should the openings 110 not be properly positioned to receive the studs 111, the collar 103 is compressed against the tension of the spring 107 until the openings 110 have been brought in alignment therewith. The sliding movement of the shell 116 is limited by the stock pin 122 operating in a slot 123 in the collar 112.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

What is claimed is:

1. A corn harvester including a wheel-supported platform, a knife carried by said platform to sever the stalks near their base, a gathering means supported by the platform including a member movable to a position in back of the stalks being presented to the knife for bracing the stalks during the cutting operation, an operable means for actuating said brace member into and out of said bracing position, and trip means for setting said brace arm in operation.

2. A corn harvester including a wheel-supported platform, a knife carried by said platform to sever the stalks near their base, a gathering means supported by the platform including a member movable to a position in back of the stalks being presented to the knife for bracing the stalks during the cutting operation, an operable means for actuating said brace member into and out of said bracing position, and trip means for setting said brace arm in operation, said trip means being positioned in advance of the knife to be engaged and actuated by the stalks being presented to the knife.

3. A corn harvester including a wheel-supported platform, a knife carried by said platform to sever the stalks near their base, a gathering means supported by the platform including a member movable to a position in back of the stalks being presented to the knife for bracing the stalks during the cutting operation, an operable means for actuating said brace member into and out of said bracing position, said brace member being yieldably mounted to yield against the pressure of the corn stalks between it and said knife and giving said member a quick rearward motion after said stalks have been severed, and trip means for setting said brace arm in operation, said trip means being positioned in advance of the knife to be engaged and actuated by the stalks being presented to the knife.

4. A corn harvester including a wheel-supported platform, a knife carried by said platform to sever the stalks near the base thereof, a gathering means supported by the platform including an oscillating member normally positioned in advance of the knife and to one side of a row of stalks, said member having an initial movement rearwardly to engage in back of the stalks being presented to the knife for bracing them during the cutting operation, a source of power on the platform, an operable means for oscillating said member into and out of said bracing position, trip means normally lying in advance of the knife and in the path of stalks presented thereto and actuated by pressure of said stalks thereagainst, and means actuated by the trip member for connecting said operable means with said power source.

5. A corn harvester including a wheel-supported platform, a knife carried by said platform to sever the stalks near the base thereof, a gathering means supported by the platform including an oscillating member normally positioned in advance of the knife and to one side of a row of stalks, said member having an initial rearward movement to engage in back of the stalks being presented to the knife for bracing them during the cutting operation, a source of power, an operable means for oscillating said member into and out of said bracing position, trip means normally lying in advance of the knife and in path of stalks presented thereto and actuated by pressure of said stalks thereagainst, means actuated by the trip member for connecting said operable means with said power source and also actuated by the reverse movement of said oscillating member to disengage the operable means from the power source.

6. A corn harvester including a wheel-supported platform, a knife carried by said platform to sever the stalks, a gathering means supported by the platform including an oscillating arm normally positioned in advance of the knife and to one side of a row of stalks, said member having an initial rearward movement to engage in back of the stalks being presented to the knife for bracing them during the cutting operation, trip means normally urged to a position in advance of the knife and in path of stalks presented thereto and actuated by pressure of said stalks thereagainst, means actuated by the trip member for oscillating said arm into and out of said bracing position, and means for holding the trip means out of path movement of the stalks during cutting operation to permit the stalks to fall rearwardly of the knife, and for permitting said trip means to return to normal position with the return of said oscillating bracing member.

7. A corn harvester comprising a wheeled platform, a stationary cutting knife on a forward edge thereof to cut the stalks, spaced gathering rods projecting forwardly of the knife and between which the stalks are guided to the knife, a driving means mounted on said platform and actuated from the forward motion of the wheels of said harvester and including a clutch mechanism, a vertical shaft mounted adjacent said knives, means between said shaft and said driving means for oscillating the said shaft, a trip arm loosely mounted on said shaft and normally urged forwardly in advance of said knife and between said guide rods and movable rearwardly by engagement with corn stalks being presented to the knife, a clutch operating mechanism positioned to be actuated by said trip arm to engage the clutch members, when said trip is moved rearwardly whereby said shaft is placed in operation, a sweep brace arm normally lying outside of said guide rods and mounted on said shaft to move therewith and to initially move rearwardly toward the knife and in back of the stalks being presented to the knife, means on said shaft and engageable with the trip arm for limiting its forward movement and for moving the same rearwardly of the knife and out of the path of movement of the stalks being cut, a means actuated by the reverse movement of the shaft to disengage the clutch members when said brace arm and trip arm have been returned to normal position.

8. A corn harvester comprising a wheeled platform, a stationary cutting knife on a forward edge thereof to cut the stalks, spaced gathering rods projecting forwardly of the knife and between which the stalks are guided to the knife, a driving means mounted on said platform and actuated from the forward motion of the wheels of said harvester and including a clutch mechanism, a vertical shaft mounted adjacent said knives, means between said shaft and said driving means for oscillating the said shaft, a trip arm loosely mounted on said shaft and normally urged forwardly in advance of said knife and between said guide rods and moved rearwardly by engagement with corn stalks being presented to the knife, a clutch operating mechanism positioned to be actuated by said trip arm to engage the clutch members, when said trip is moved rearwardly whereby said shaft is placed in operation, a sweep brace arm normally lying outside of said guide rods and mounted on said shaft to move therewith and to initially move rearwardly toward the knife and in back of the stalks being presented to the knife, means on said shaft and engageable with the trip arm for limiting its forward movement and for moving the same rearwardly of the knife and out of the path of movement of the stalks being cut, a means actuated by the reverse movement of the shaft to disengage the clutch members when said brace arm and trip arm have been returned to normal position, said brace sweep arm being yieldably mounted on the shaft to yield against the pressure of the corn stalks thereagainst and giving said arm a quick rearward motion after said stalks have been severed.

9. A corn harvester comprising a wheeled platform, a stationary cutting knife on a forward edge thereof to cut the stalks, spaced gathering rods projecting forwardly of the knife and between which the stalks are guided to the knife, a crib disposed to the rear of said knives for receiving the cut stalks, a driving means mounted on said platform and actuated from the forward motion of the wheels of said harvester and including a clutch mechanism, a vertical shaft mounted adjacent said knives, an operable connection between said shaft and said driving means for oscillating the said shaft, a spring pressed trip arm loosely mounted on said shaft and normally urged in advance of said knife and between said guide rods and moved rearwardly by engagement with corn stalks being presented to the knife, a cam on said trip arm, a clutch operating mechanism positioned to be actuated by said cam to engage the clutch members when said trip is moved rearwardly, whereby said shaft is placed in operation, a sweep brace arm normally lying outside of said guide rods and mounted on said shaft to move therewith and to initially move rearwardly toward the knife and in back of the stalks being presented to the knife, a lug fast on said shaft and engageable with the trip arm for moving the same rearwardly of the knife and out of the path of movement of the stalks being cut, a second cam means on said shaft engageable with the clutch operating mechanism upon the reverse movement of said shaft for actuating said mechanism to disengage the clutch members, when said brace arm and trip arm have been returned to normal position.

10. A corn harvester comprising a platform, traction wheels for said platform, gathering and cutting mechanism mounted on the forward end of the platform, the rear end portion being of an area to accommodate an upstanding corn shock formed from the cut stalks, and a shock unloading means including a flexible cable adapted to form a loop sling around the shock, wench mechanism on the platform arranged and connected with said cable to draw the bight of said loop-sling toward the rear end of said platform, a drive-connection between the traction wheels of wench mechanism, and operating means for connecting and disconnecting said drive-connection.

11. A corn harvester comprising a platform, traction wheels for said platform, gathering and cutting mechanism mounted on the forward end of the platform, the rear end portion being of an area to accommodate an upstandng corn shock formed from the cut stalks, a traction wheel actuated means for unloading said shock in upstanding position from the rear portion of the platform, and a manual control means for rendering said unloading means operative and inoperative.

12. A corn harvester comprising a platform, traction wheels for said platform, gathering and cutting mechanism mounted on the forward end of the platform, the rear end portion being of an area to accommodate an upstanding corn shock formed from the cut stalks, a shock unloading mechanism including a pair of wenches, one arranged on each side of said platform and each connected to an end of said cable, sheaves disposed and supported at the rear end corner portions of the platform and having said cable trained thereover, said cable being adapted to form a loop-sling around the shock with its bight around the front side thereof, a drive connection between each wench and its adjacent traction wheel, and operating means for connecting and disconnecting said drive connection.

13. A corn harvester comprising a platform, traction wheels for said platform, gathering and cutting means mounted on the forward end of the platform, a shock crown former supported on the platform and over and above the rear portion thereof, whereby the cut stalks may be formed into an upstanding shock on the platform, said crown former being vertically adjustable, whereby it may be moved out of engagement with the top of the shock, and means for unloading the shock in its upstanding position.

14. A corn harvester comprising a platform, traction wheels for said platform, gathering and cutting means mounted on the forward end of the platform, a shock crown former supported on the platform and over and above the rear portion thereof, whereby the cut stalks may be formed into an upstanding shock on the platform, said crown former including an annulus having spaced arms radiating from its axial center and being vertically adjustable, whereby it may be moved out of engagement with the top of the shock, and means for unloading the shock in its upstanding position.

15. In a corn harvester, a wheeled platform of a width to straddle two rows of corn, a draft device at the center portion of the forward end of said platform, gathering and cutting devices arranged on the forward end of the platform, one on each side of said draft device; a pair of spaced cribs arranged, one in back of each gathering and cutting device; and an area on the rear portion of said platform upon which a shock may be formed; the space between said cribs providing a station area for the attendant to gather the cut stalks from said cribs.

16. In a harvester, a platform including front and rear sections, traction wheels for each section, said sections having their adjacent edges substantially abutting and complementally arcuate transversely of said platform, and a link means extending between said sections and pivotally connected thereto at points spaced from said edges.

17. In a corn harvester, a platform of a width to straddle two rows of corn, the front end of said platform having a forwardly projecting extension, an upright slotted hanger on said extension, an axle vertically adjustable and rotatably mounted in the slotted hanger, traction wheels rotatably mounted on said axle, a pawl and ratchet connection between said wheels and axle and arranged to drive said axle upon the forward motion of said wheels, an operable gathering and cutting means arranged on opposite sides of said platform, and a drive connection between said means and said axle.

18. In a corn harvester, a platform and traction wheels therefor, an operable gathering and cutting means on the platform, a drive connection between said means and said traction wheels, a clutch in said drive connection and having relatively movable male and female members, each having complemental opposing surfaces having interengageable parts, one of said surfaces being yieldable under the advancing pressure of the other surface, until said parts interengage, and a clutch control device actuated by the movement of said means for engaging and disengaging said clutch.

19. In a harvester, a gathering means including a trip arm normally urged to a position in the path of the material being gathered, a sweep arm normally lying out of the path of said material being gathered, mechanism to operate said sweep arm to move the same in back of said gathered material and toward the harvester when said trip arm is engaged and moved by said gathered material, and means actuated by the reverse movement of the sweep arm to render said operating mechanism ineffective when the brace arm has been returned to normal position.

20. In a harvester, a gathering means including a trip arm normally urged to a position in the path of the material being gathered, a sweep arm normally lying out of the path of said material being gathered, mechanism to positively operate said sweep arm to move the same in back of said gathered material and toward the harvester when said trip arm is engaged and moved by said gathered material, means actuated by said operating mechanism for positively moving said trip arm out of the path of said gathered material, after the tripping operation thereof, and means actuated by the reverse movement of the sweep arm to render said operating mechanism ineffective when the brace arm has been returned to normal position.

21. In a harvester, a gathering means including a vertical oscillatable shaft, a spring-pressed trip arm loosely mounted on the shaft and normally urged to a position in the path of movement of the gathered material, a cam on the trip arm, a mechanism actuated by the cam to operate said shaft, a sweep arm normally lying out of the path of said gathered material and mounted on said shaft to move therewith and to move inwardly in the back of said gathered material and toward the harvester, a lug fast on said shaft and engageable with said trip arm for advancing the same out of the path of the advancing movement of said gathered material after the tripping operation thereof; a second cam means on the shaft for rendering said shaft-operating mechanism inoperative, when said sweep arm and said trip arm have been returned to normal position.

22. In a harvester, a gathering means including a trip arm normally urged to a position in the path of the material being gathered, a sweep arm normally lying out of the path of said material being gathered, mechanism to operate said sweep arm and set in motion by said trip arm to move the sweep arm in back of said gathered material and toward the harvester when said trip arm is engaged and moved by said gathered material.

23. In a harvester, a gathering means including a sweep arm normally lying out of the path of the material being gathered, mechanism to operate the sweep arm and to move the later in back of the gathered material and toward the harvester, said sweep arm being yieldably mounted to yield against the pressure of the gathered material thereagainst and giving said sweep arm a quick rearward motion after said pressure has been relieved.

24. In a harvester, a wheeled platform, gathering and cutting devices arranged on the platform and including a swinging arm arranged to move back and forth from a point in advance of said cutter rearwardly over said platform and in advance of the material being gathered and cut, means for actuating said arm back and forth, and a resilient guard normally unobstructing the passage of the gathered and cut material to said platform and positioned to be engaged by said arm on its return movement and to be moved in a position to prevent the gathered and severed material from being thrown out the platform by said reverse movement of said arm.

In testimony whereof I have hereunto set my hand.

RICHARD E. PERKINS.